United States Patent
Lu

(10) Patent No.: US 8,661,619 B2
(45) Date of Patent: Mar. 4, 2014

(54) HINGE ADJUSTER

(75) Inventor: Wei Lu, Dongguan (CN)

(73) Assignee: Dongguan Weihong Hardware and Plastic Products Co., Ltd., Dongguan, Guangdong (CN)

( * ) Notice: Subject to any disclaimer, the term of this patent is extended or adjusted under 35 U.S.C. 154(b) by 0 days.

(21) Appl. No.: 13/813,931

(22) PCT Filed: Jan. 11, 2012

(86) PCT No.: PCT/CN2012/070202
§ 371 (c)(1),
(2), (4) Date: Feb. 1, 2013

(87) PCT Pub. No.: WO2013/104115
PCT Pub. Date: Jul. 18, 2013

(65) Prior Publication Data
US 2013/0333161 A1  Dec. 19, 2013

(51) Int. Cl.
*E05D 11/10* (2006.01)

(52) U.S. Cl.
USPC ............... 16/326; 16/321; 16/335; 16/352; 16/354; 16/334

(58) Field of Classification Search
CPC ...... A47C 20/00; A47C 20/04; A47C 20/043; A47C 20/046; A47C 20/047; A47C 1/06; A47C 1/10; A61G 15/12; A61G 15/125; A61G 15/105; B60N 2/4855; B60N 2/48; B60N 2/4805; B60N 2/4817; B60N 2/4841; E05D 11/1007; E05D 11/1028; E06C 1/383; E06C 1/3835
USPC ........... 16/319, 321, 324, 325, 326, 335, 352, 16/334, 354, 387, 389; 297/356, 367 R, 297/364, 366, 115, 61, 62, 64, 391, 400, 297/403, 408, 410; 403/91–94, 96–98; 182/163, 164, 165
See application file for complete search history.

(56) References Cited

U.S. PATENT DOCUMENTS

| | | | | | |
|---|---|---|---|---|---|
| 4,230,414 | A | * | 10/1980 | Cheshire | 403/95 |
| 5,123,768 | A | * | 6/1992 | Franklin | 403/96 |
| 6,711,780 | B2 | * | 3/2004 | Lee | 16/326 |
| 6,926,363 | B2 | * | 8/2005 | Yamashita | 297/366 |
| 7,052,089 | B2 | * | 5/2006 | May | 297/408 |
| 2003/0189372 | A1 | * | 10/2003 | Shephard | 297/366 |
| 2009/0288270 | A1 | * | 11/2009 | Yamashita | 16/239 |
| 2010/0293748 | A1 | * | 11/2010 | Yamashita | 16/249 |

FOREIGN PATENT DOCUMENTS

| | | | | |
|---|---|---|---|---|
| CN | 201870189 U | * | 6/2011 | |
| GB | 2436121 A | * | 9/2007 | |
| JP | 10028624 A | * | 2/1998 | |

* cited by examiner

Primary Examiner — Chuck Mah
(74) Attorney, Agent, or Firm — Shimokaji & Associates P.C.

(57) ABSTRACT

A hinge adjuster includes a first frame, at least one locking piece, at least one spring component, at least one second frame and a pair of cover. The first frame defines at least one locking hole including a first accommodating hole and a second accommodating hole. The locking piece is slidably placed in the first accommodating hole for engaging with the first accommodating hole or the engaging notch alternatively. At least one groove for engaging with the locking piece is configured on a pivoted portion of the second frame, which includes a flat portion, a dentiform portion, and an end portion. And the locking piece is protruded from the locking hole and contacting with the flat portion, the dentiform portion or the end portion selectively. The hinge adjuster has strong supporting capability and can achieve a cyclic adjustment of angles, and the operation is simple and convenient.

10 Claims, 8 Drawing Sheets

HINGE ADJUSTER

FIELD OF THE INVENTION

The present invention relates to a hinge, more particularly to a hinge adjuster which has strong supporting capability and can achieve a cyclic adjustment of angles, and the operation is simple and convenient.

BACKGROUND OF THE INVENTION

Commonly, a backrest of a sofa is provided with a pillow for people to lean. Typically, tilting angles of the pillow can be adjusted by an adjuster, so as to suit for different supporting angles demanded by different users to obtain a comfortable feeling.

A conventional adjuster for pillows generally utilizes a rotating plate connecting with the pillow. Users can apply a force to the rotating plate via the pillow, so that an inner gear connecting with the rotating plate is driven to rotate, and in turn, a relative movement between the inner gear and the outer gear is generated as a result of engaging. And the position of the outer gear could not be moved as the outer gear is withstood by a spring, thus a trend that the outer gear engages with the inner gear is always maintained. As a result, when the inner gear is rotated along engaging teeth of the outer gear, the outer gear must carry on one engaging process with the inner gear after the inner gear is engaged with one of engaging teeth, so as to achieve the angle location of the rotating plate and, in turn to adjust the pillow to a suitable position gradually. However, in the conventional adjuster, the location of the rotating plate is depended on elasticity of the spring applied to the outer gear. Thus the inner gear and the outer gear are hard to engage with each other as the spring is easy to be exhausted due to its strength is limited, or the inner gear and the outer gear are hard to localize as a larger force from the user is applied to the pillow. Therefore the supporting capability of the adjuster after localization is weak and limited.

SUMMARY OF THE INVENTION

One objective of the present invention is to provide a hinge adjuster, which has strong supporting capability and can achieve a cyclic adjustment of angles, and the operation is simple and convenient.

To achieve the above objective, a hinge adjuster provided in the present invention includes a first frame, at least one locking piece, at least one spring component, at least one second frame and a pair of covers. The first frame includes a connecting portion at a front end thereof and a fixture at a rear end thereof, the connecting portion defining at least one locking hole which includes a first accommodating hole and a second accommodating hole communicated with each other, an engaging notch is formed at an inner wall of the first accommodating hole. The fixture includes a threaded post, an upper gasket, a lower gasket and a nut, a contacting edge is formed between the threaded post and the first frame, the upper gasket is set on the threaded post movably and adapted for contacting with the contacting edge when being at the topmost end of the threaded post, the lower gasket is set on the threaded post, and the nut is connected with the threaded post. The locking piece is slidably placed in and protruded from the first accommodating hole, and is adapted for engaging with the inner wall of the first accommodating hole or the engaging notch alternatively. The spring component is accommodated in the second accommodating hole, one end of which is contacted with the second accommodating hole, and the other end of which is contacted with a side of the locking piece elastically. The second frame includes a pivoted portion at a front end thereof for pivotally connecting to the connecting portion of the first frame, the pivoted portion defining at least one groove for engaging with the locking piece, an inner surface of the groove includes a flat portion, a dentiform portion, and an end portion arranged in a clockwise direction. And a portion of the locking piece that is protruded from the locking hole contacts with the flat portion, the dentiform portion or the end portion selectively. The covers are covered on the connecting portion and the pivoted portion at opposite sides thereof.

Preferably, the number of the locking hole is two, and the two locking holes are symmetrical with a central axis of the connecting portion, by which the two locking holes accommodating the locking pieces can share and balance the force.

Preferably, an indentation is formed on a bottom of the locking piece, whose width matches with a thickness of the inner wall of the first accommodating hole. Thus, the locking piece is engaging with the first accommodating hole via the indentation, which can prevent the locking pieces from displacing.

Preferably, the first accommodating hole is rectangular, the second accommodating hole is arc-shaped, and the first accommodating hole is connected with the second accommodating hole smoothly.

Preferably, the number of the second frame is two, and the two second frames are connected with each other and fixed on opposite sides of the first accommodating hole symmetrically. By this arrangement, the force between the second frame and the first frame is balanced, which enhances the strength of the hinge adjuster and extend its life.

Specifically, the hinge adjuster further includes a connecting frame which is bended to form a connecting surface and a supporting surface, and the connecting surface is connected with a rear end of the second frame firmly. It's convenient for the supporting frame to support other objects, to adjust angles of the objects.

More specifically, several connecting pins and pin bushes are provided on the second frame, the connecting pins pass through the second frame and the connecting frame to fix the second frame and the connecting frame, and the pin bushes are set on the connecting pins. The structure is simple and compact.

Specifically, several locating holes are formed in the supporting surface. The locating holes are helpful for connecting the objects to the connecting frame, and the operation process is simple and quick.

Preferably, the spring component is a spring leaf.

Preferably, at least one protrusion is extended from an edge of the cover, at least one recess is formed in a brim of the second frame, and the protrusion engages with the recess. With the arrangement of the covers, external substance can be prevented from falling into the groove to cause the locking piece fail to lock or cause the hinge adjuster hard to adjust.

In comparison with the prior art, as the first frame of the present invention defines at least one locking hole, the second frames define at least one groove, and the locking pieces and the spring leafs are mounted in the locking holes, thus the spring leafs can be contacted with the locking pieces elastically. Furthermore, the locking piece is protruded from the locking hole so as to cooperate with the grooves at opposite sides, and an inner surface of the groove includes the flat portion, dentiform portion and end portion. When pivoting the second frames, the locking piece can be engaged with the different tooth grooves of the dentiform portion selectively under the action of the dentiform portion and the spring component, so as to adjust angles. Additionally, the flat portion and the end portion are used for or compressing or pushing the locking piece to the engaging notch, so that the second frame can be restored when achieving the maximum angle. In conclusion, the hinge adjuster can be adjusted as long as the user pivots the second frames far away from the first frame, and the hinge adjuster is positioned at a supported status in a direction that approaches to the first frame. The hinge adjuster with strong supporting capability of the present invention can achieve a cyclic adjustment of angles, and the operation is simple and convenient.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
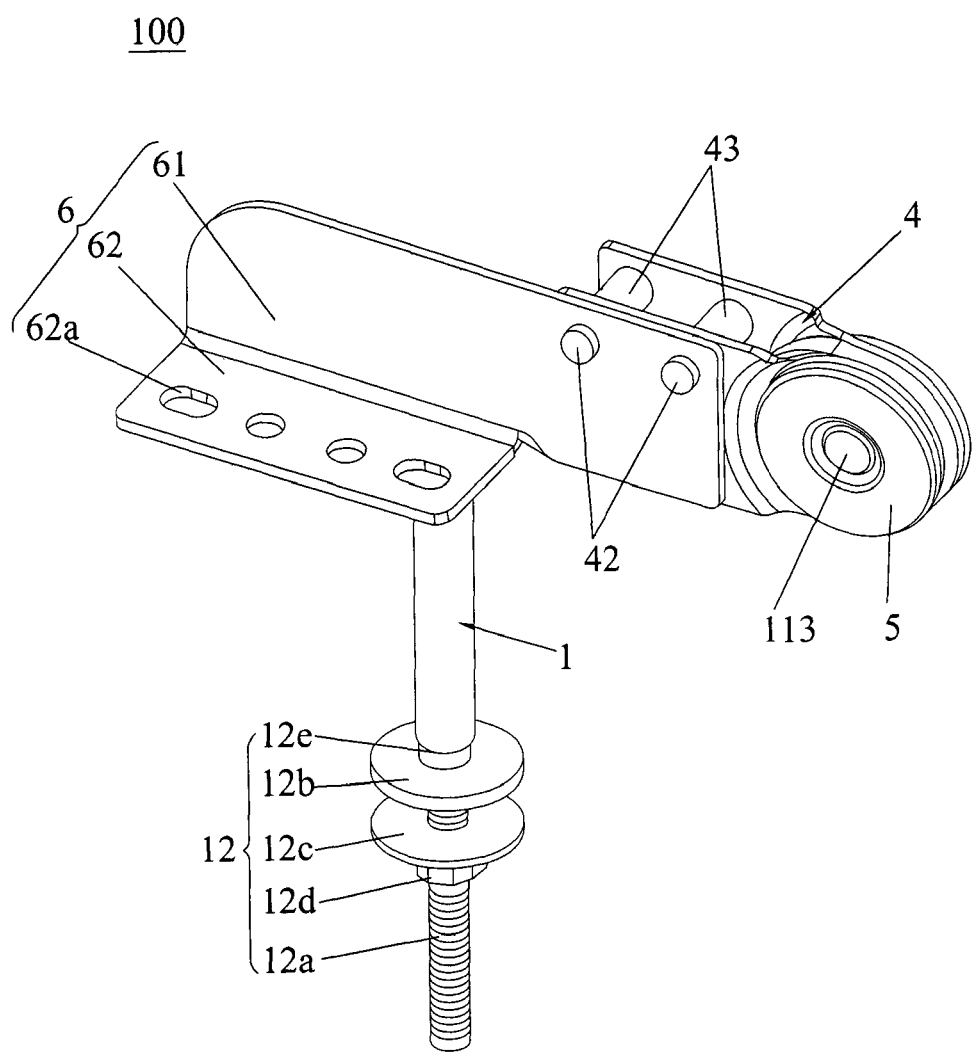
FIG. 1 is a perspective view of a hinge adjuster according to one embodiment of the present invention.
Figure 2:
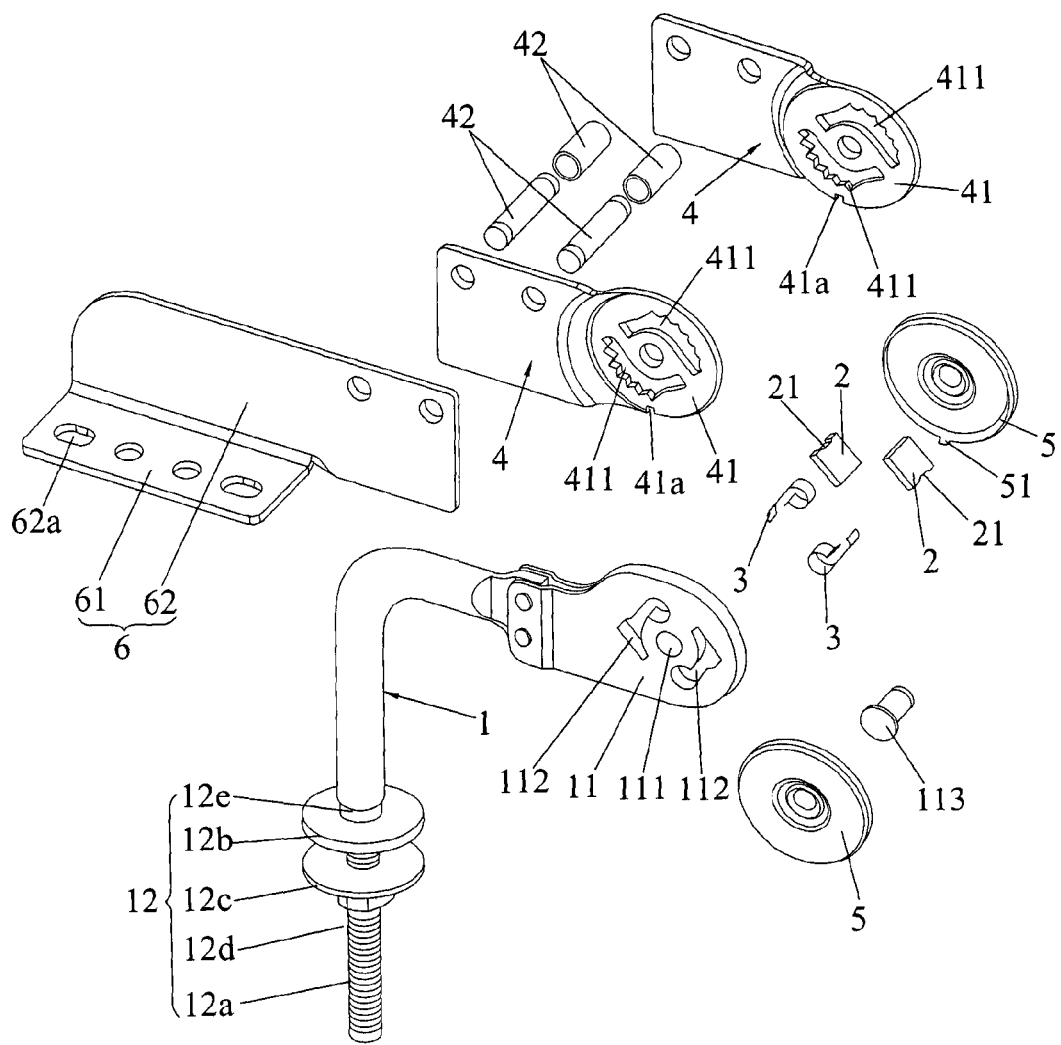
FIG. 2 is an exploded view of the hinge adjuster of FIG. 1.

As illustrated in FIGS. 1 and 2, the hinge adjuster 100 of the present invention is applied to a pillow of a sofa (not shown), which can adjust angles of the pillow, so as to achieve a comfortable feeling for the users. The hinge adjuster 100 according to one embodiment of the present invention includes a first frame 1, two locking pieces 2, two spring components 3, two second frames 4, a pair of covers 5, and a connecting frame 6.

Figure 3:
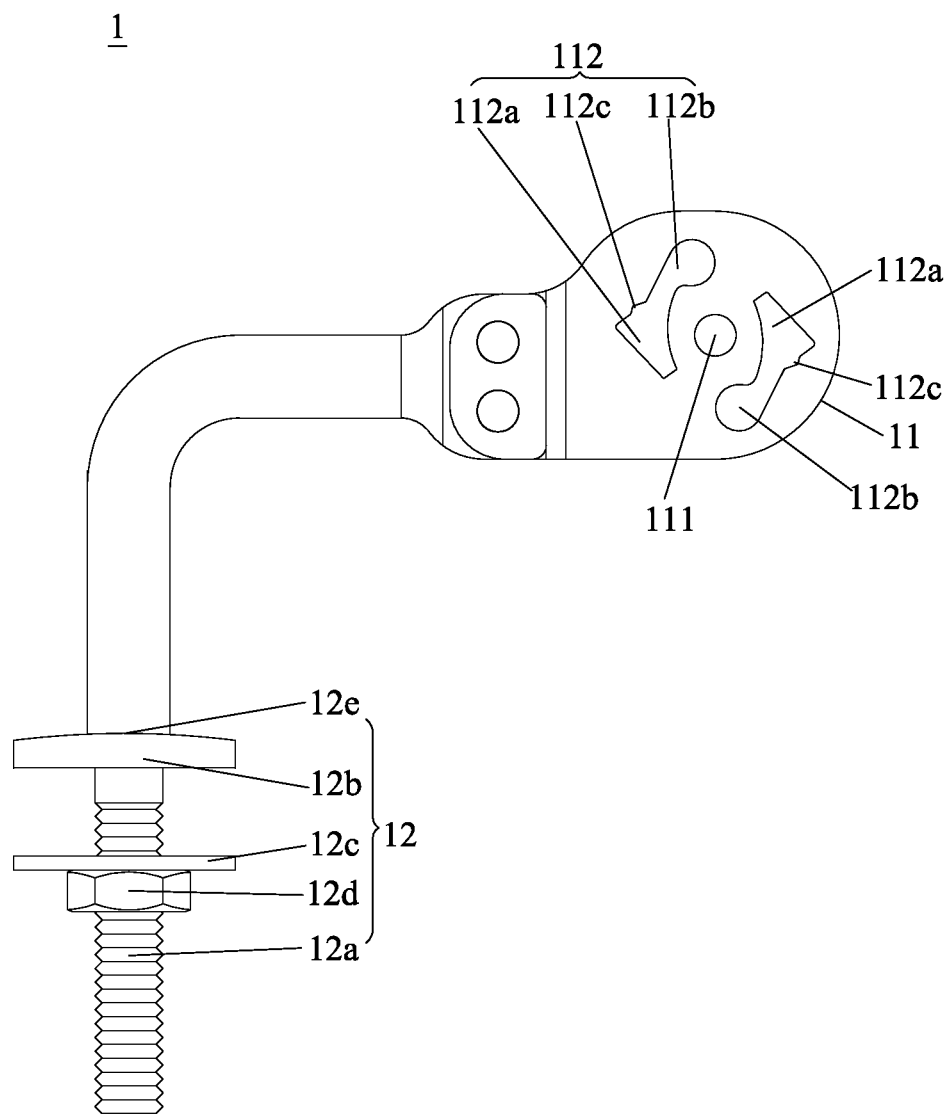
FIG. 3 is a view of a first frame of the hinge adjuster according to one embodiment of the present invention.

Referring to FIGS. 2 and 3, the first frame 1 includes a sheet-shaped connecting portion 11 at its front end, a connection hole 111 is formed on the center of the connecting portion 11, and two locking holes 112 which are symmetrical with the connection hole 111 are formed on the surface of the connecting portion 11. Specifically, each locking hole 112 includes a first accommodating hole 112a and a second accommodating hole 112b which are communicated with each other. Concretely, the first accommodating hole 112a is rectangular, the second accommodating hole 112b is arc-shaped, and the first accommodating hole 112a is connected with the second accommodating hole 112b smoothly. And an engaging notch 112c is formed in the inner wall of the first accommodating hole 112a. As illustrated, the first frame 1 further includes a fixture 12 at its rear end, which includes a threaded post 12a, an upper gasket 12b, a lower gasket 12c, and a nut 12d. A contacting edge 12e is formed between the threaded post 12a and the first frame 1, and the upper gasket 12b is set on the threaded post 12a movably and adapted for contacting with the contacting edge 12e when being at the topmost end of the threaded post 12a. The lower gasket 12c is set on the threaded post 12a, and the nut 12d is connected with the threaded post 12a. When in use, a mounting plate of the sofa is provided with a through hole (not shown), the threaded post 12a passes through the through hole, and the mounting plate is sandwiched between the upper and lower gaskets 12b, 12c; and then the nut 12d is screwed on the threaded post 12a with an upper surface of the upper gasket 12b contacting with the contacting edge 12e, so that the first frame 1 is mounted on the mounting plate of the sofa, which the installation process is simple and quick.

As shown in FIG. 2, the locking piece 2 is slidably placed in and protruded from the first accommodating hole 112a. The locking piece 2 is provided with an indentation 21 at its bottom, whose width matches with the thickness of the inner wall of the first accommodating hole 112, so that the locking piece 2 can be engaged within the first accommodating hole 112a, thereby preventing two ends of the locking piece 2 from displacing. Additionally, the locking piece 2 can be engaged with the inner wall of the first accommodating hole 112a or the engaging notch 112c alternatively. As the two locking pieces 2 are received within the first accommodating holes 112a of the locking holes 112, thus force suffered by the locking holes 2 is reduced and shared, and the force is much even.

Referring to FIG. 2 again, the spring component 3 is accommodated within the second accommodating hole 112b, one end of which is contacted with and withstood the second accommodating hole 112b, and the other end of which is contacted with one side of the locking piece 2 elastically. Concretely, the spring component 3 is a spring leaf 3. Specifically, the two ends of the spring leaf 3 are arc-shaped, and one end is contacted with a lower side of the locking piece 2 to push the locking piece 2 outwards elastically, so that the locking piece 2 can be maintained in the first accommodating hole 112a.

Figure 4:
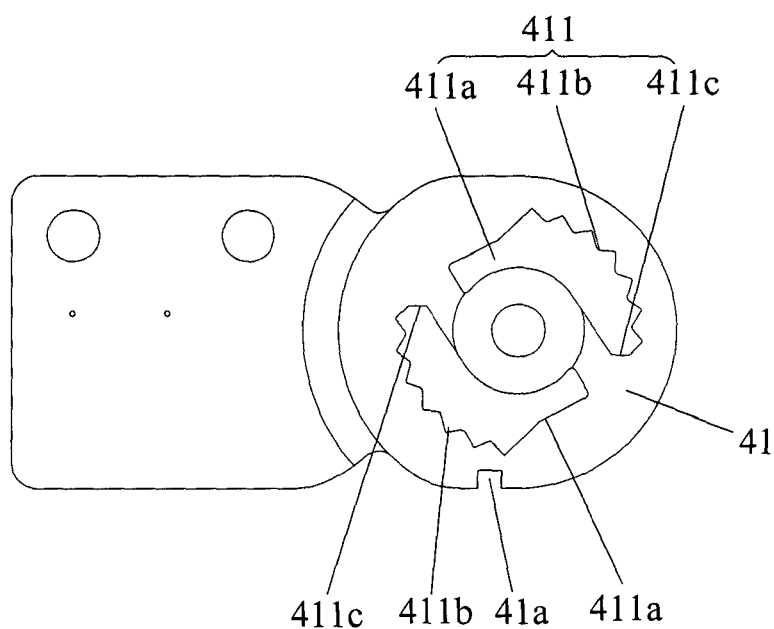
FIG. 4 is a view of a second frame of the hinge adjuster according to one embodiment of the present invention.

Combining FIG. 2 with FIG. 4, the second frames 4 are located at opposite sides of the first frame 1 symmetrically. Specifically, a pivoted portion 41 is provided at a front end of each second frame 4, which is shaped as a downward step and pivotally connected with the connecting portion 11 via a pin 113. A groove 411 is provided at the pivoted portion 41 for engaging with the locking piece 2, which includes a flat portion 411a, a dentiform portion 411b and an end portion 411c arranged in a clockwise direction. The locking piece 2 protrudes from one end of the locking hole 112 and contacts with the flat portion 411a, dentiform portion 411b or end portion 411c selectively. Preferably, the amount of engaging tooth on the dentiform portion 411b can be designed according to the actual demand. In this embodiment, the dentiform portion 411b is arc-shaped with an adjustable angle range of 90°, and the amount of the engaging tooth is seven, and the amount of tooth groove is six. Therefore, the adjustable angle of the second frame 4 is 90°, and the adjusted angle for each time is 15°. The second frame 4 is provided with two connecting pins 42 and two pin bushes 43, the connecting pins 42 pass through and firmly connect to the second frame 4 and the connecting frame 6, and the pin bushes 43 are set on the connecting pins 42. As two second frames 4 are provided in this embodiment, thus the force between the second frame 4 and the first frame 1 can be balanced, thereby enhancing the strength of the hinge adjuster 100 and extending its life.

Preferably, the connecting frame 6 is bended to form a connecting surface 61 and a supporting surface 62, and the connecting surface 61 is connected with the rear end of the second frame 4 firmly. By this arrangement, the connecting frame 6 can be supported or connected to other objects, thereby adjusting the angle of the objects thereon. Specifically, several locating holes 62a are provided at the supporting surface 62, by which the objects can be connected to the connecting frame 6 conveniently with simple and quick operation.

The covers 5 are configured at opposite sides of the second frames 4 and covered the pivoted portion 41. Specifically, at least one protrusion 51 is extended from an edge of the cover 5, a recess 41a is formed in a brim of the pivoted portion 41 of the second frame 4, and the protrusion 51 is engaging with the recess 41a. With the arrangement of the covers 5, external substance can be prevented from falling into the groove 411 to cause the locking piece 2 fail to lock or cause the hinge adjuster 100 hard to adjust.

Referring to FIGS. 5-8, operation principle of the hinge adjuster 100 of the present invention will be described as follow.

Figure 5:
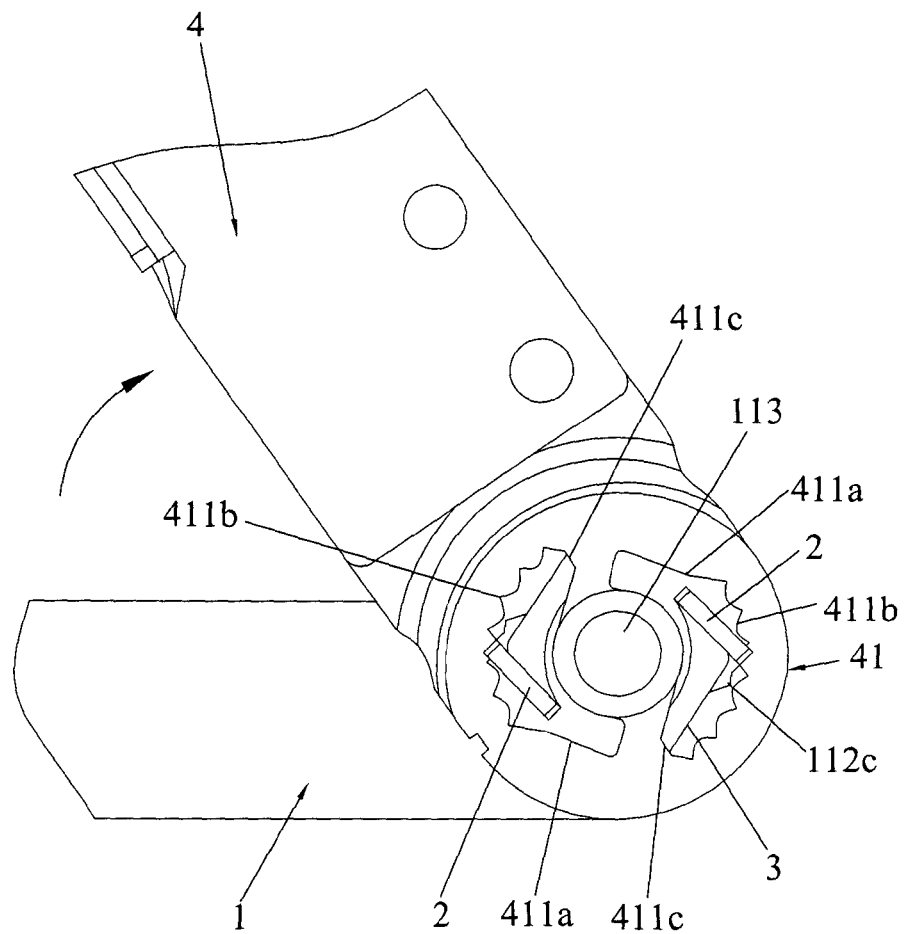
FIG. 5 is a status schematic view illustrating that the hinge adjuster is opened at a certain angle.

As shown in FIG. 5, when the hinge adjuster 100 is positioned at a certain angle, the locking pieces 2 are accommodated in the first accommodating hole 112a, the indentation 21 is engaged with the inner wall of the first accommodating hole 112a, and two ends of the locking piece 2 are received in the groove 411 and engaged by one tooth groove of the dentiform portion 411b. When the pillow of the sofa is supported by the second frame 4, the pillow will apply a downward force to the connecting frame 6 while enduring a force, which causes a trend that the second frame 4 to pivots closely to the first frame 1 (anticlockwise, as illustrated in FIG. 5). Therefore the pivoted portion 41 could not pivot since the dentiform portion 411b is engaging with the end of the locking piece 2, which causes the second frame 4 not to be pivotal and serve as a supporter instead. When the angle of the pillow is needed to adjust, a handler pivots the second frame 4 clockwise to drive the pivoted portion 41, so that the dentiform portion 411b of the groove 411 is pivoted around the center axis of the pivoted portion 41. Meanwhile, the locking piece 2 is pushed by one side of the present tooth groove that the locking piece 2 is engaged, so that the locking piece 2 is withdrawn from the tooth groove and compresses the spring leaf 3 simultaneously. When the pivoted portion 41 is rotated to a demanded angle, the next tooth groove is driven to a position corresponding to the locking piece 2. Here, the locking piece 2 is expanded to engage with the corresponding tooth groove due to the elastic restoring action of the spring leaf 3, thereby the locking piece 2 is engaging with the dentiform portion 411b again, and the second frame 4 is locked with the first frame 1 under the current angle so that it can support the pillow. Repeat the operation mentioned above, the angle of the second frame 4 can be adjusted.

Figure 6:
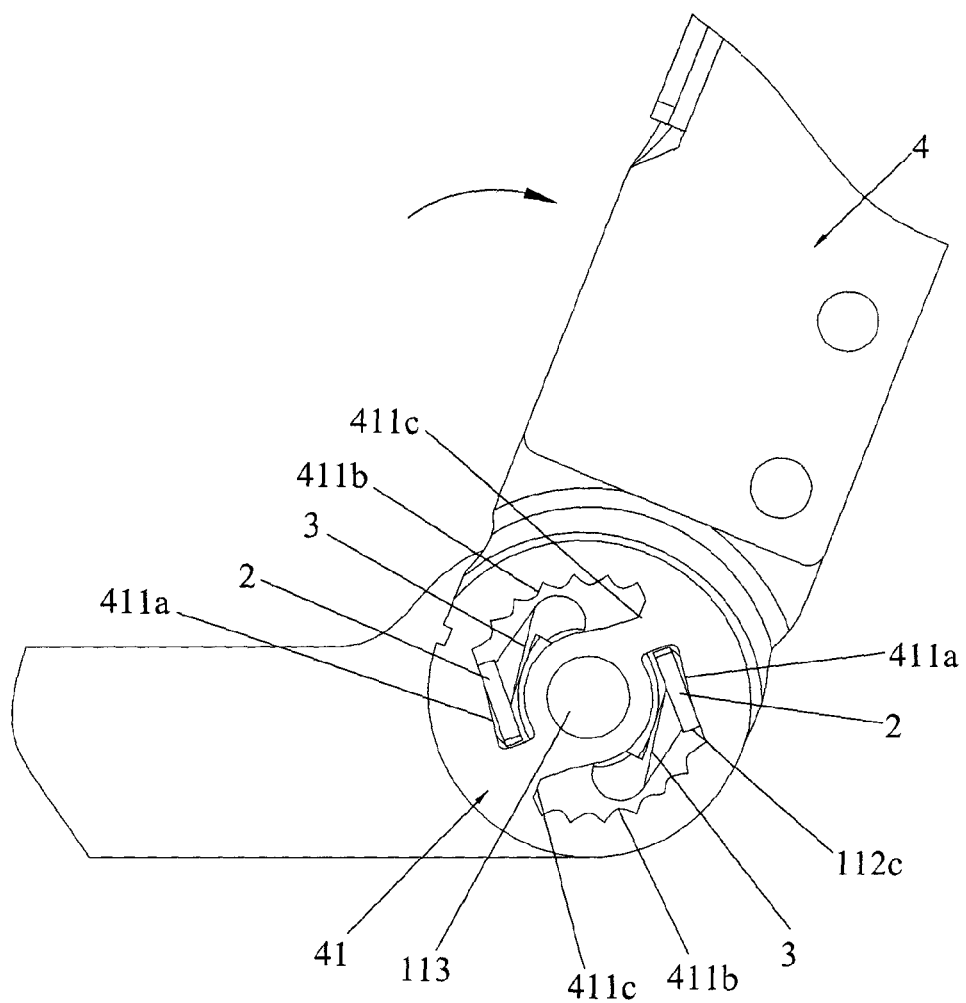
FIG. 6 is a status schematic view illustrating that the hinge adjuster is unfolded completely and unlocked.
Figure 7:
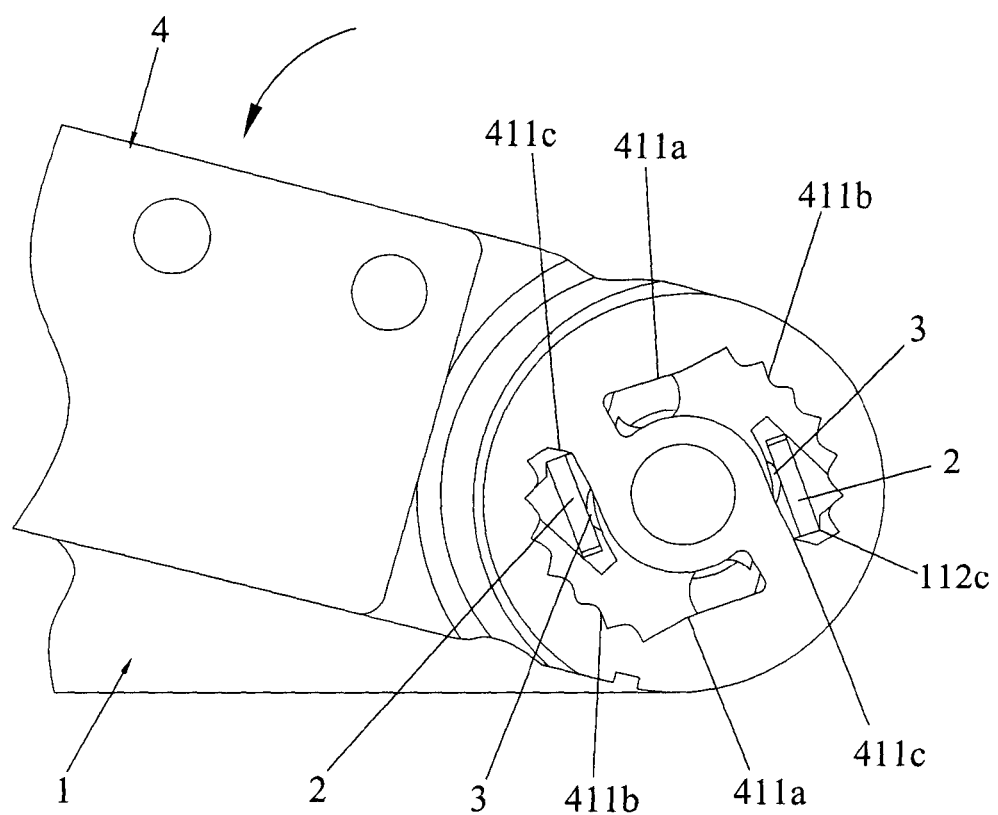
FIG. 7 is a status schematic view illustrating that the hinge adjuster is before folded completely.
Figure 8:
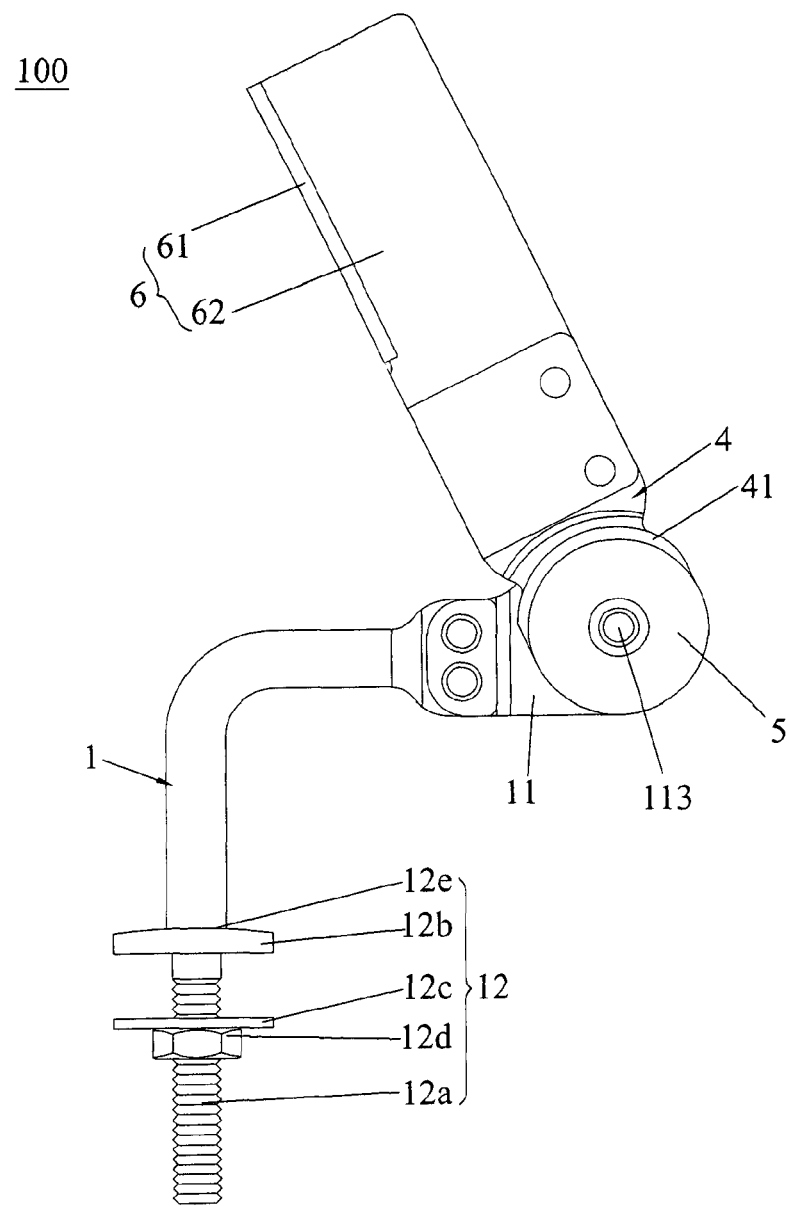
FIG. 8 is a status schematic view illustrating that the hinge adjuster is unfolded.

As illustrated in FIG. 6, when the second frame 4 is adjusted to the maximum angle, the locking piece 2 is engaging with the last tooth groove of the dentiform portion 411b, at this time the flat portion 411a of the pivoted portion 41 is contacting with the side of the locking piece 2. When the second frame 4 is needed to adjust to a smaller angle or folded, it's easy to pivot the second frame 4 clockwise so that the flat portion 411a pushes the locking piece 2 to the engaging notch 112c with the indentation 21 of the locking piece 2 engaging with the engaging notch 112c and the spring leaf 3 contacting with the side of the locking piece 2. At this time, the locking piece 2 disengages from the dentiform portion 411b, and the pivoted portion 41 is under an unlocking status (namely the second frames 4 can be folded toward the first frame 1 by pivoting anticlockwise). As shown in FIG. 7, when the second frame 4 is pivoted to a certain angle, the end of the pivoted portion 41 contacts with and pushes the locking piece 2 to cause the locking piece 2 to slide to the first accommodating hole 112a and engage with the first tooth groove of the dentiform portion 411b again. Under this status, the second frame 4 and the first frame 2 are folded completely, and the angle of the second frame 4 can be adjusted by pivoting clockwise again. In this way, the hinge adjuster 100 can be adjusted cyclically.

In the present invention, as the first frame 1 defines the locking holes 112, the second frames 4 define the grooves 411, and the locking pieces 2 and the spring leafs 3 are mounted in the locking holes 112, thus the spring leafs 3 can be contacted with the locking pieces 2 elastically. Furthermore, the locking piece 2 is protruded from the locking hole 112 so as to cooperate with the grooves 411 at opposite sides, and the inner surface of the groove 411 includes the flat portion 411a, dentiform portion 411b and end portion 411c. When pivoting the second frame 4, the locking piece 2 can be engaged with the different tooth grooves of the dentiform portion 411b selectively under the action of the dentiform portion 411b and the spring leaf 3, so as to adjust angles. Additionally, the flat portion 411a and the end portion 411c are used for or compressing or pushing the locking piece 2 to the engaging notch 112c, so that the second frame 4 can be restored when achieving the maximum angle. In conclusion, the hinge adjuster 100 can be adjusted as long as the user pivots the second frame 4 far away from the first frame 1, and the hinge adjuster 100 is positioned at a supported status in a direction that approaches to the first frame 1. The hinge adjuster 100 with strong supporting capability can achieve a cyclic adjustment of angles, and the operation is simple and convenient.

Because the sizes of the first frame 1 and the second frames 4, the assembly way between the connecting frame 6 and the pillow are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:
1. A hinge adjuster, comprising,
a first frame having a connecting portion at a front end thereof and a fixture at a rear end thereof, the connecting portion defining at least one locking hole which comprises a first accommodating hole and a second accommodating hole communicated with each other, an engaging notch being formed in an inner wall of the first accommodating hole, the fixture comprising a threaded post, an upper gasket, a lower gasket and a nut, a contacting edge being formed between the threaded post and the first frame, the upper gasket being set on the threaded post movably and adapted for contacting with the contacting edge when being at the topmost end of the threaded post, the lower gasket being set on the threaded post, and the nut being screwed on the threaded post;
at least one locking piece slidably placed in and protruded from the first accommodating hole, and being adapted for engaging with the inner wall of the first accommodating hole or the engaging notch alternatively;
at least one spring component accommodated in the second accommodating hole, one end of which being contacted with the second accommodating hole, and the other end of which being contacted with a side of the locking piece elastically;

at least one second frame having a pivoted portion at a front end thereof for pivotally connecting to the connecting portion of the first frame, the pivoted portion defining at least one groove for engaging with the locking piece, an inner surface of the groove comprising a flat portion, a dentiform portion, and an end portion arranged in a clockwise direction, and a portion of the locking piece that is protruded from the locking hole contacting with the flat portion, the dentiform portion or the end portion selectively; and a pair of covers covered on the connecting portion and the pivoted portion at opposite sides thereof.

2. The hinge adjuster according to claim 1, wherein the number of the locking hole is two, and the two locking holes are inverted symmetrical with a central axis of the connecting portion.

3. The hinge adjuster according to claim 1, wherein an indentation is formed on a bottom of the locking piece, whose width matches with a thickness of the inner wall of the first accommodating hole.

4. The hinge adjuster according to claim 1, wherein the first accommodating hole is rectangular, the second accommodating hole is arc-shaped, and the first accommodating hole is connected with the second accommodating hole smoothly.

5. The hinge adjuster according to claim 1, wherein the number of the second frame is two, and the two second frames are connected with each other and fixed on opposite sides of the first frame symmetrically.

6. The hinge adjuster according to claim 5, further comprising a connecting frame which is bended to form a connecting surface and a supporting surface, and the connecting surface being connected with a rear end of the second frame.

7. The hinge adjuster according to claim 6, wherein several connecting pins and pin bushes are provided on the second frames, the connecting pins pass through the second frames and the connecting frame to fix the second frames to the connecting frame, and the pin bushes are respectively set on the connecting pins.

8. The hinge adjuster according to claim 6, wherein several locating holes are formed in the supporting surface.

9. The hinge adjuster according to claim 1, wherein the spring component is a spring leaf.

10. The hinge adjuster according to claim 1, wherein at least one protrusion is extended from an edge of at least one of the covers, at least one recess is formed in a brim of the pivoted portion of the second frame, and the protrusion engages with the recess.

* * * * *